United States Patent Office 3,445,201
Patented May 20, 1969

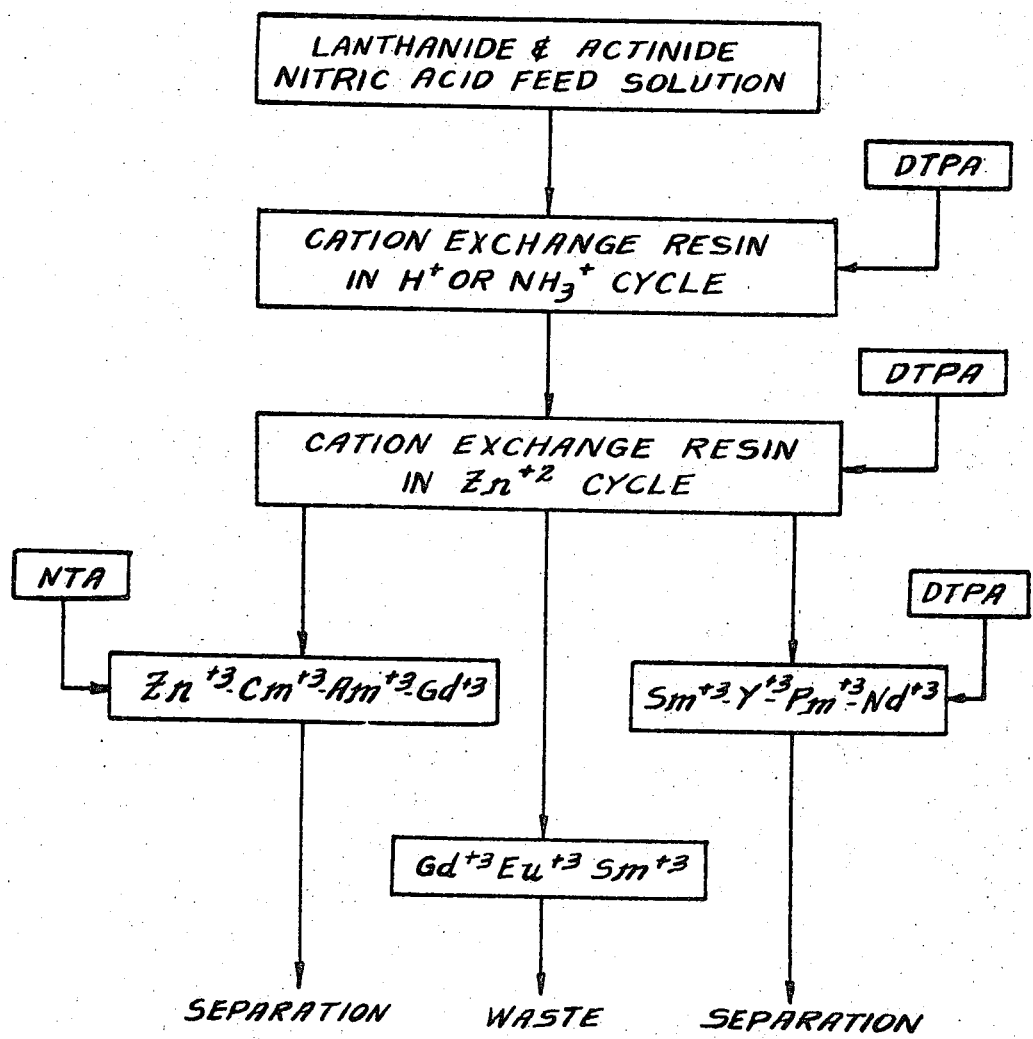

3,445,201
ION EXCHANGE PROCESS FOR RECOVERING AMERICIUM AND CURIUM
Earl J. Wheelwright, Richland, Wash., assignor to the United States of America as represented by the United States Atomic Energy Commission
Filed Mar. 27, 1968, Ser. No. 716,497
Int. Cl. C01g 56/00; C01f 17/00
U.S. Cl. 23—338                                7 Claims

ABSTRACT OF THE DISCLOSURE

A process for separating americium and curium values from lanthanide and actinide values and from each other by eluting the values through a cation exchange resin bed with diethylenetriamine-pentaacetic acid to separate the americium-curium values which are then separated from each other by elution with nitrilotriacetic acid.

Contractual origin of the invention

The invention described herein was made in the course of, or under, a contract with the United States Atomic Energy Commission.

Background of the invention

This inveniton relates to a process for separating americium and curium from a solution of lanthanide and actinide values. More specifically this invention relates to an ion exchange process for separating americium and curium from a nitric acid feed solution containing these and other lanthanides and actinides and recovering these values individually in a pure form.

The demand for curium and americium is increasing as new uses for them are developed. Curium has been used as a heat source in small auxiliary power units which can be used to supply electricity in satellites and space vehicles. Americium can be mixed with beryllium as a neutron source. The neutrons result from the interaction of the alpha particles emitted by the heavy elements with the light element beryllium. Both curium and americium can be reirradiated in an isotope reactor to form heavier transuranium elements such as californium and berkelium.

These elements are found along with other lanthanide and actinide values in nuclear reactor fuel reprocessing waste solutions and thus are available in reasonable quantities once they are separated from the waste solutions.

At the present, these values are generally recovered by a rather complex method entailing a number of different types of chemical separation processes. Each of these separation processes requires specialized equipment different from that needed for any of the other processes. Because of the intense radioactivity emitted by these and other values present in the reprocessing solution, recovery must take place in heavily shielded rooms or hot cells which are expensive to construct. Because of the large amount of equipment required, a large amount of expensive space is necessary for the separation method.

In addition, because of the number of processes required for the recovery, a good deal of handling of the solutions is required which increases recovery costs and which may decrease the quantity of values recovered.

Brief description of the drawing

The drawing shows a flow diagram of the process of this invention.

Summary of the invention

I have invented a process for recovering americium and curium values from each other and from a solution containing these and other lanthanide and actinide values which eliminates some of the disadvantages of the prior art process. The process of this invention comprises passing a solution of diethylenetriaminepentaacetic acid (hereinafter referred to as DTPA) through an ion exchange resin bed which has been loaded with these values. The effluent from this first bed is passed over a second ion exchange resin bed, until the values present are separated into their characteristic bands. The values are then eluted from the column with DTPA and the effluent containing the americium and curium values is passed into a third ion exchange resin bed where the americium and curium are separated from each other by eluting them from the resin bed with nitrilotriacetic acid (hereinafter referred to as NTA).

It is therefore the object of this invention to provide a relatively simple and compatible process for separating americium and curium values from each other and from the other lanthanide and actinide values present in nuclear reactor fuel reprocessing waste solutions.

Description of the preferred embodiment

This and other objects of this invention can be attained by saturating a cation exchange resin bed with actinide and lanthanide values by passing a nitric acid feed solution containing these values through the bed. The values are eluted from this resin bed with an aqueous solution of 0.050 M DTPA at pH 6–7 into a second resin bed which has been preconditioned with zinc ions. Elution through this second bed separates the various values into their respective bands and separates the americium-curium fraction from the europium. Continued elution of the values through this bed with DTPA permits fractional separation of the effluent containing the americium-curium values which is then flowed onto a third cation exchange resin bed also preconditioned with zinc ions. The other values, including promethium, may be fractionally separated from each other as they are eluted from the second column.

The americium-curium values are eluted from the third resin bed with a 0.105 M aqueous solution of NTA at pH 6.5. This separates the americium and curium values so that they may be fractionally collected in the effluent and reduced by methods known to those skilled in the art to recover the pure metal.

The nitric acid feed solution contains from 0.1 to 0.5 M hydrogen ions. The values present may hydrolyze and form a precipitate if less hydrogen ion is present. Concentrations greater than 0.5 M will lower the amount of material which may be loaded on the ion exchange resin bed. The concentration of lanthanide-actinide values contained in the nitric acid feed solution is generally about 0.5 M.

All cation exchange resins are suitable for the process of this invention. A resin commercially available under the name of Dowex 50W cross linked to 8% was used for the investigations of the process of this invention. Dowex 50W is made according to Example I of U.S. Patent No. 2,366,007, granted to D'Alelio on Dec. 26, 1944. The particle size of the resin may vary widely, but particles between 50 and 100 mesh were used with especially good results. For the initial loading of the lanthanide and actinide values, the resin can be used in either the $H^+$ or the $NH_3^+$ cycle.

The zinc ion in the second and third resin beds serves as a barrier to restrain the leading edge of the front band and to keep all bands compact so that the resin can be saturated to full capacity and the lengths of the individual bands do not change as they move down the column. To convert the resin to the zinc form, it is contacted with a 1 M zinc nitrate or zinc sulfate solution to completely convert the resin to the zinc cycle.

Zinc was found to be the best barrier ion. Copper and lead were also considered. However, these ions are reduced in the presence of the complexing agent when subjected to radiation, forming a precipitate which was difficult to remove from the resin bed.

From 0.025 M to 0.062 M DTPA may be used as the elutant, although 0.050 M was preferred. The lower concentrations tend to lengthen separation time and produce more waste solution, whereas the higher concentrations were unstable and may form precipitates.

A concentration of 0.105 M NTA was found to work best, although 0.050 to 0.131 M may be used.

Ammonium hydroxide was the choice to buffer both elutants to a pH of 6 to 7. Sodium hydroxide may also be used. However, the sodium ion presents some problems during recovery of the separated values.

A column temperature of 60–65° C. is preferred, although temperatures from 45° C. to 80° C. are satisfactory. Below 45° C. the bands of the various elements tend to become indistinct and smear, resulting in poor separation. Above 80° C. the radiation present causes radiolysis of the water and the complexing agent present, forming a gas which must be removed to prevent disruption of the eluant flow, which will cause poor results.

Flow rates for DTPA of from 3–4 ml./min.-cm.$^2$ are preferred. This flow rate is measured on the diameter of the smallest column in the separation system at the time. Higher flow rates resulted in poorer separations of the elements.

With NTA good separation should result from flow rates of 3 to 10 ml./min.-cm.$^2$, although only rates from 3 to 6 ml./min.-cm.$^2$ have been tested.

The use of DTPA with a cation resin bed containing zinc barrier ions to sparate promethium and americium from each other and from other lanthanide fission products is known an results in the following elution sequence: $Zn^{+2}$, $Pb^{+2}$ ($Dy^{+3}$, $Ho^{+3}$, $Er^{+3}$) $Cm^{+3}$, $Am^{+3}$, $Gd^{+3}$, $Eu^{+3}$, $Sm^{+3}$, $Y^{+3}$, $Pm^{+3}$, $Nd^{+3}$, $Pr^{+3}$. It can be seen that curium elutes slightly ahead of americium which makes separation of the two values difficult.

It was discovered, however, by substituting NTA for the DTPA while using the resin in the zinc cycle, that the relative elution positions of americium and yttrium are altered so that the elution sequence becomes: $Ho^{+3}$, $Y^{+3}$, $Cm^{+3}$, $Gd^{+3}$ ($Eu^{+3}$, $Am^{+3}$) $Sm^{+3}$, $Pm^{+3}$.

This permits good separation factors to be attained with this invention. It will be noted that the europium and americium elute in about the same relative position when using NTA. This problem is eliminated in the first separation cycle using DTPA where the europium can easily be separated from effluent containing the americium-cerium values.

The following example is given as an illustration of the process of this invention and is not to be taken as limiting the scope or extent of the invention.

Example

A nitric acid feed solution containing 837 grams $Am^{241}$, 56.7 grams $Cm^{244}$ and 185 grams $Pm^{147}$ in addition to other lanthanide fission products was divided and loaded into two 250-liter beds of Dowex 50W X-8 (50–100 mesh) resin the H$^+$ cycle and the loaded resin washed with dermineralized water. The feed solution also contained 0.41 M hydrogen ions.

A number of columns of the same resin were prepared in the zinc cycle with an aqueous solution of zinc nitrate.

The absorbed band of trivalent ions was then eluted from the feed bed through the zinc cycle resin with an aqueous solution of 0.050 M DTPA, buffered to pH 6.5 with NH$_4$OH and pumped at a rate of 3.8 ml./min.-cm.$^2$. The columns were thermostatically controlled to operate at 60–65° C.

After the bands were formed, elution was continued and the bands separated by fractionally collecting the effluent. The effluent containing the americium and curium values was sent to storage tanks for further separation. At this time, upon completion of the first cycle, a product summary was made, as shown in Table I.

In Table I is a summary of the product recovery made after completion of the first or DTPA cycle.

TABLE I

| Isotope | Product (gms.) | End cuts (gms.) | Material balance, percent |
| --- | --- | --- | --- |
| $Am^{241}$ | 718.0 | 80 | 95 |
| $Cm^{244}$ | 59.8 | 0.010 | 105 |
| $Pm^{147}$ | 120.2 | 31.3 | 82 |

Promethium recovery as shown was final. Although the percent of recovery appears low, it agrees with recoveries which are obtained under production conditions.

The stored solution containing the americium-curium values was pumped into a bed of Dowex 50W X-8 (50–100 mesh) in the hydrogen ion cycle and the resin washed with 150 liters of 0.050 M NH$_4$NO$_3$ to remove all absorbed hydrogen ion from the resin and to prevent possible precipitation of the acid form of the eluting agent. The values are then eluted through beds of the resin in the zinc cycle with 0.105 M NTA buffered to pH 6.38 with NH$_4$OH. The columns were operated at 60–65° C. and the flow rate was 3–6 ml./min.-cm.$^2$. Upon elution the effluent was fractionally collected and the results analyzed.

The final results are shown in Table II.

TABLE II

| Isotope | Feed (gms.) | Recovered (gms.) | Material Balance, percent |
| --- | --- | --- | --- |
| $Am^{241}$ | 837 | 785 | 91 |
| $Cm^{244}$ | 56.7 | 54.3 | 96 |

It can be seen that good separation was attained between the americium and curium and that little valuable product was lost during the process. Although the second cycle was commenced by loading the curium-americium effluent, this is not necessary. The effluent from the first cycle containing the americium-curium values may be flowed directly on the second resin bed in the zinc cycle and the NTA substituted for the DTPA without the intermediate step used in the above example.

It will be understood that the invention is not to be limited to the details given herein but that it may be modified within the scope of the appended claims.

The embodiments of the invention in which an exclusive property or privilege is claimed are defined as follows:

1. A method of separating americium and curium values from each other and from a mixture of lanthanide and actinide values contained in a nitric acid feed solution comprising: passing said solution over a first cation exchange resin whereby the values are absorbed on the resin, eluting said values by passing diethylene-triamine-pentaacetic acid (DTPA) over the resin and flowing the effluent from the resin containing the values over a second cation exchange resin in the zinc form whereby the values are concentrated in their characteristic bands, eluting said values by passing DTPA over the resin bed and flowing the effluent containing the americium and curium values over a third cation exchange resin in the zinc form, passing nitrilotriacetic acid (NTA) over the third resin bed, thereby separating the americium and curium values from each other and fractionally collecting the effluent containing said values 2. The process of claim 1 wherein the DTPA is from 0.025 to 0.062 M and NTA is from 0.050 to 0.131 M.

3. The process of claim 2 wherein the pH of DTPA is from 6–7 and the pH of the NTA is from 6–7.

4. The process of claim 2 wherein the hydrogen ion concentration of the nitric acid feed solution is from 0.1 to 0.5 mole.

5. The process of claim 3 wherein the temperature of the cation exchange resin bed is from 45–80° C.

6. The process of claim 3 wherein the temperature of the cation exchange resin separation is accomplished from 60–65° C.

7. A method of separating americium and curium values from each other and from a mixture of lanthanide and actinide values contained in a nitric acid feed solution comprising: adjusting the hydrogen ion content of said feed solution to 0.1 to 0.5 molar, passing said solution over a first cation exchange resin at a temperature of 60–65° C. whereby said values are absorbed on the resin, passing an aqueous solution containing 0.050 M DTPA over said first resin and flowing the effluent from the resin containing the values over a second cation exchange resin in the zinc form at a temperature of 60–65° C. whereby the values are concentrated in their characteristic bands, eluting the values by passing an aqueous solution of 0.050 M DTPA over the resin and flowing the effluent containing the americium and curium values over a third cation exchange resin in the zinc form at a temperature of 60–65° C.; passing an aqueous solution containing 0.105 M NTA over said third resin bed, thereby separating the americium and curium values from each other, and fractionally collecting the effluent containing said values.

References Cited

UNITED STATES PATENTS

| | | | |
|---|---|---|---|
| 3,192,012 | 6/1965 | Rice | 260—429.1 |
| 3,161,463 | 1/1963 | Orr | 23—338 |

OTHER REFERENCES

Auer-Welsbach: Chromatographic Se Pn. of Cm. and Am. Nucl. Sci. Abs. (NSA) 21–40786, Nov. 30, 1967.

Ali: Chelate Formation of Trivalent Trans Plutonium Elements with Nitrilotriacetic Acids, NSA, 22–6291, Feb. 29, 1968.

BENJAMIN R. PADGETT, *Primary Examiner.*

M. J. McGREAL, *Assistant Examiner.*

U.S. Cl. X.R.

23—343; 260—429.1